W. H. WAGGAMAN.
PROCESS FOR THE MANUFACTURE OF SULFURIC ACID.
APPLICATION FILED SEPT. 4, 1915.
1,185,029.
Patented May 30, 1916.
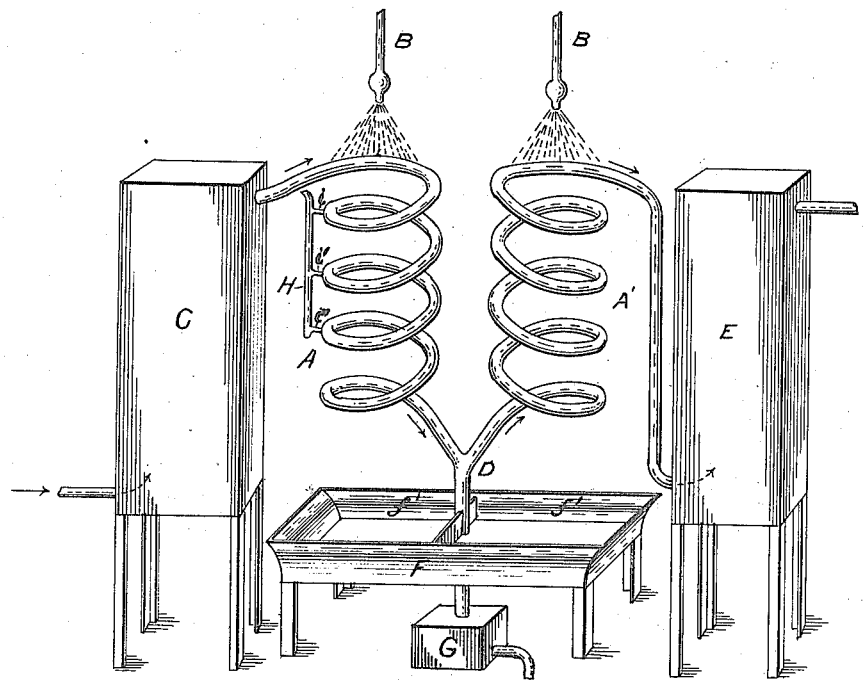

UNITED STATES PATENT OFFICE.

WILLIAM H. WAGGAMAN, OF WASHINGTON, DISTRICT OF COLUMBIA.

PROCESS FOR THE MANUFACTURE OF SULFURIC ACID.

1,185,029.  Specification of Letters Patent.  Patented May 30, 1916.

Application filed September 4, 1915. Serial No. 49,118.

(DEDICATED TO THE PUBLIC.)

*To all whom it may concern:*

Be it known that I, WILLIAM H. WAGGAMAN, a citizen of the United States, and an employee of the Department of Agriculture of the United States of America, residing at Washington, District of Columbia, (whose post-office address is Washington, District of Columbia,) have invented a new and useful Process for the Manufacture of Sulfuric Acid.

This application is made under the act of March 3, 1883, chapter 143 (22 Stat. 625), and the invention herein described and claimed may be used by the Government of the United States or any of its officers or employees in the prosecution of work for the Government, or any person in the United States, without payment to me of any royalty thereon.

My invention relates to the treatment of the furnace gases evolved in the burning of sulfur or a sulfid ore for the purpose of converting them rapidly and in the smallest possible space into sulfuric acid.

My invention is based on the fact that efficient production of sulfuric acid is largely dependent on a thorough mixing of the reacting gases and the control of their temperature. By means of the apparatus herein described both of these conditions can be fulfilled.

In the ordinary chamber process by which most of the sulfuric acid is manufactured, the gases after leaving the furnace are passed first through the Glover tower, which consists of a lead tower packed with quartz down which nitrosulfuric acid (obtained from the Gay Lussac tower) trickles.

The heat of the burner gases drives off from this acid, water and the oxids of nitrogen both of which are necessary in the formation of sulfuric acid. From the Glover tower these gases and water vapor are led by a flue into the first of a series of lead chambers which usually consist of large square or oblong lead boxes into which water is introduced in the form of spray or steam. Most of the sulfuric acid is made in the first chamber since at this stage the gases are more concentrated and active, and their temperature more favorable for the necessary reactions to take place. Because of the large dimensions and shape of the chambers they contain relatively inactive zones where there is little movement and very incomplete mixing of the gases taking place, consequently the reactions proceed but slowly. This is increasingly evident in the subsequent chambers where the reacting gases are greatly diluted by the residual nitrogen derived from the air and the temperature of the mixture is below that most favorable for the production of sulfuric acid.

My invention does not propose to do away with or greatly modify the Glover or Gay Lussac towers at present employed in chamber plants but has for its object the substitution of two or more lead pipes made in the form of spirals for the chambers now ordinarily used. Whereas, I do not limit myself to pipes of any particular size or length. Those having a diameter equal to that of the flues used in connecting the chambers in the ordinary chamber process are probably best suited for the purpose. The forcing of the hot gases downward through the first spiral which can be readily cooled, tends to mix them thoroughly and at the same time lowers their temperature. By employing a second spiral similar to and connected with the first, but forcing the partially spent and cooled gases upward instead of downward through the tube, which may be artificially heated if necessary to enhance the reactions, a very complete conversion of the furnace gases into sulfuric acid may be effected in a short time without the employment of large and expensive lead chambers.

The accompanying drawing illustrates the preferable form of apparatus which I employ in the practice of my process. The spirals shown therein are of my own conception.

Referring to the drawings, A and A' represent two lead spirals which are used in place of the lead chambers. The upper end or gas entrance of A is connected directly with the Glover tower C which is of the usual type and needs no further description. The lower end or exit of the spiral A is connected with the lower end or entrance of the spiral A'. The lower ends of both spirals are connected with the acid tank G by the common tube D. The exit end of the spiral A' is connected with the lower part of the Gay Lussac tower E which is also of the usual type.

B and B' are water sprays to control the temperature of the reacting gases in A and A'.

F is a metal or earthen ware container divided into two tanks $f$ and $f'$ to catch the water dripping from A and A', respectively.

H is a pipe for water or steam which is injected into the first spiral A through the jets $i$, $i'$ and $i''$.

The operation is as follows: The hot gases from the Glover tower enter the spiral A and are led downward by a forced draft. The jets $i$, $i'$ and $i''$ furnish the water necessary for the production of the sulfuric acid. The temperature of the gases in A is lowered if necessary by a spray B, of cold water obtained from the tank $f'$. The gases which still remain are then drawn up through the spiral A' which can be heated if necessary by the spray B of warm water obtained from the tank $f$.

The resistance of the hot gases to the downward pull in spiral A, and the resistance of the cooler gases to the upward pull in spiral A', coupled with their constant change in direction mixes them thoroughly and brings about the necessary reactions in the shortest possible time and within the smallest possible cubic chamber space. Moreover, the immense amount of surface exposed by the spirals makes it possible to control the temperature of the gases contained therein within the limits most favorable for the efficient and economical production and precipitation of sulfuric acid.

Having now described my invention, I claim:

1. The process of making sulfuric acid which comprises passing the gases from a Glover tower, together with water vapor, into and through a relatively long sinuous channel, whereby an efficient intermixing of the gases and consequent formation of acid takes place.

2. The process of making sulfuric acid, which comprises passing the gases from a Glover tower, together with water vapor, into and through a relatively long sinuous channel, effecting an equalization and control of the temperature of said gases by transferring the heat from the front to the rear portion of the said channel by means of water, whereby an efficient intermixing of the gases and consequent formation of acid takes place.

3. The process of making sulfuric acid, which comprises passing the gases from a Glover tower, together with water vapor, into and through a relatively long sinuous channel, effecting an equalization and control of the temperature of said gases by transferring the heat from the front to the rear portion of the said channel by means of water, whereby an efficient intermixing of the gases and consequent formation of acid takes place, collecting the acid formed during the operation in a chamber connected with and below said sinuous channel.

In testimony whereof, I have hereunto signed my name in the presence of two subscribing witnesses.

WILLIAM H. WAGGAMAN.

Witnesses:
William H. Fry,
R. O. E. Davis.